United States Patent Office 3,168,575
Patented Feb. 2, 1965

3,168,575
REARRANGEMENT OF ALLYLIC ETHERS
Thomas J. Prosser, Sherwood Park, Wilmington, Del., assignor to Hercules Powder Company, Wilmington, Del., a corporation of Delaware
No Drawing. Filed Aug. 23, 1960, Ser. No. 51,300
7 Claims. (Cl. 260—615)

The present invention relates to a process for the preparation of $\alpha,\beta$-unsaturated ethers by rearrangement of allylic ethers and to certain novel $\alpha,\beta$-unsaturated ethers thereby obtained.

In accordance with the invention, it has been found that allyl and methallyl ethers of saturated mono- to hexahydric alcohols can be rearranged into propenyl and isobutenyl ethers, respectively, by contacting the allylic ether at an elevated temperature with a strongly basic compound of an alkali metal in a homogeneous reaction mixture. When the starting allyl or methallyl ether is an ether of a polyhydric alcohol that normally contains at least 3 hydroxyl groups, the products of the process are new and useful propenyl and isobutenyl ethers to which the invention also relates.

More specifically, the invention relates to a process for making $\alpha,\beta$-unsaturated ethers which comprises contacting an allylic ether selected from the class consisting of allyl and methallyl ethers of a saturated mono- to hexahydric alcohol, said allylic ether being free from hydroxyl groups in 1,3-position to each other, with a catalytic amount of a strongly basic compound of an alkali metal in a homogeneous reaction mixture at a temperature ranging from about 100° to 250° C. whereby each allylic group of said allylic ether is rearranged to an $\alpha,\beta$-unsaturated group. The invention further relates to new and useful $\alpha,\beta$-unsaturated ethers that contain a combined total of at least 3 hydroxyl groups and $\alpha,\beta$-unsaturated groups selected from the class consisting of propenyl and isobutenyl groups, in which total there is at least one $\alpha,\beta$-unsaturated group, said ethers being free from hydroxyl groups in 1,3-position to each other. One of the unusual features of the invention is that the product ethers are virtually 100% cis isomers as shown by their infra spectra.

The starting materials for the process of the invention are allyl and methallyl ethers of any saturated alcohol that normally contains from 1 to 6 hydroxyl groups. The ether can be either partial or complete; that is, all of the hydroxyl groups normally possessed by the alcohol can be etherified with an allyl or methallyl group or, in the case of polyhydric alcohols, any number of hydroxyl groups less than the total number of hydroxyl groups can be so etherified with an allyl or methallyl group. There is one further proviso, however, which is that the starting ether must not contain hydroxyl groups in 1,3-position to each other because in such cases rearrangement by the process of the invention is not feasible since the ethers undergo base-catalyzed decomposition in preference to rearrangement.

Typical allylic ethers useful in the process include the allyl and methallyl ethers of simple monohydric alcohols such as ethyl allyl ether, ethyl methallyl ether, propyl allyl ether, propyl methallyl ether, cetyl allyl ether, cetyl methallyl ether, cyclohexyl methallyl ether, and the like; and allyl and methallyl ethers of more highly functional alcohols such as mono- and di-allyl glycerol, mono- and di-methallyl glycerol, triallyl pentaerythritol, tetraallyl pentaerythritol, trimethallyl pentaerythritol, 1,4-diallyloxybutane, 4-allyloxy-1-butanol, 1,5-diallyloxypentane, 1,6-diallyloxyhexane, diallyl trimethylolpropane, hexallyl sorbitol, hexallyl mannitol, diallyl pentaerythritol iso-propylidene ketal, the ethylene oxide adduct of the diallyl ether of pentaerythritol

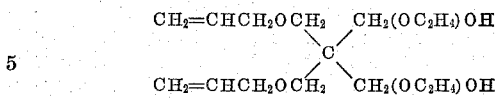

and the like.

It is a requirement of the process that it be conducted in a homogeneous reaction mixture because otherwise the reaction is exceedingly slow or does not proceed at all. This means that the strongly basic alkali metal compound must be one that is either soluble in the starting allylic ether (which permits operation without a diluent) or one which is soluble in an inert diluent in which a starting allylic ether is also soluble. Typical strongly basic alkali metal compounds that can be used (although not all are applicable under all conditions) are alkali metal hydroxides such as lithium, potassium and sodium hydroxides, and alkali metal alcoholates including, for instance, sodium, potassium and lithium methoxides, ethoxides, isopropoxides, tert-butoxides, and the like. The suitability of these compounds, as previously inferred, will vary according to the starting ether and whether or not a diluent is employed. When operating without a diluent, sodium methoxide, sodium hydroxide, and potassium hydroxide, for instance, are insoluble in some allylic ethers, e.g., 1,4-diallyloxybutane, 4-allyloxy 1-butanol, 1,5-diallyloxypentane, cetyl allyl ether, etc., but are soluble in other allylic ethers, e.g., triallyl pentaerythritol, tetraallyl pentaerythritol, etc., so that they are not useful in the former case but are useful in the latter case. Potassium tert-butoxide, on the other hand, appears to be soluble in almost all of the allylic ethers so that it can be used successfully without a diluent in virtually every case. The range of useful alkali metal compounds is further extendible, however, when operating with an inert diluent since it is possible to form a homogeneous reaction mixture by the choice of a suitable diluent from allylic ethers and alkali metal compounds that are not normally soluble in the ether. For instance, sodium methoxide is not soluble in cetyl allyl ether but by using bis(methoxyethyl)ether as an inert diluent for the reaction, a homogeneous reaction mixture is obtainable.

The amount of catalyst is widely variable. For practical purposes, any amount ranging from about 5 to 25% by weight of the allylic ether is useful although the optimum amount will be most often within the range of about 5 to 15%.

The temperature of the reaction is of considerable significance. Little or no rearrangement can be expected in any case at a temperature below about 100° C. while above a temperature of about 250° C., side reactions occur of undetermined nature. Thus the broadest practical temperature range is from about 100° C. to 250° C., with the optimum temperature generally lying between about 125° C. and 200° C. Even within these preferred temperatures, the rearrangement is by no means instantaneous and will require a significant period of time to achieve a significant degree of conversion. Reaction times ranging from about 5 hours to 10 hours are therefore recommended. The optimum time of course will vary according to the starting ether, the alkali metal compound employed and the temperature chosen for operation. One of the characteristics of the reaction which has a bearing on the reaction time is a catalyst deactivation effect. This is evidenced by the fact that the reaction progresses rapidly to a point and then subsides so that continued heating results in little, if any, further reaction. The time at which this point is reached, of course, varies with the starting ether and the amount of catalyst.

Pressure has essentially no effect on the reaction. In the normal case the reaction will be carried out at atmospheric pressure although superatmospheric pressures can be employed when the starting ether has a relatively low boiling point in order to permit the attainment of the desired reaction temperature without volatilization of the reactant or product.

Qualitatively, the rearrangement reaction can be followed by means of changes in the infrared spectra of the reaction mixture. As the rearrangement of an allyl ether progesses, the infrared spectrum will show the development of an intense band at 5.98μ indicative of propenyl C=C stretching accompanied by the development of a strong, broad band at about 13.8μ indicative of C—H out of plane bending for cis-propenyl ether. There is a corresponding decrease in absorption at 6.07μ (allylic C=C stretching) and at about 10.8μ. Related spectral modifications are observed in the rearrangement of methallyl ethers.

Also, distinct color changes are very often observed during the reaction. A yellow color frequently results upon mixing of the allylic ether and catalyst and colors deepen to orange or red-orange during the initial reaction period with a final straw-yellow color developing as the reaction proceeds to near completion.

The degree of rearrangement can be determined quantitatively by measuring the amount of residual, terminal methylene by near infrared spectrophotometry and making the appropriate calculations. The accuracy of this method has been verified by hydrolysis of the rearrangement products with acid in the presence of 2,4-dinitrophenylhydrazone and determination of the amount of propionaldehyde, or isobutyraldehyde, formed as a measure of propenyl, or isobutenyl, ether content.

The following examples are presented for the purpose of illustrating the invention. All parts and percentages are by weight unless otherwise specified.

EXAMPLES

All examples were performed in a closed, heavy-walled reaction vessel that was heated externally by contact with a heat exchange liquid. Allylic ether and catalyst were weighed directly into the reaction vessel which was then flushed with nitrogen and sealed. The contents of the vessel was then heated to a predetermined temperature and maintained at that temperature for a period of time. Samples were taken periodically by means of a sampling tube. Prior to analyzing each sample, it was dissolved in ether, the ether solution neutralized by contact with a strongly acidic cationic exchange resin filtered and stripped in vacuo for the purpose of destroying and removing the catalyst.

Distinct color changes were observed during all reactions. In general, the initial reaction mixtures were yellow. This color deepened to orange, then orange-red upon heating and finally became straw yellow after prolonged heating.

The degree of rearrangement at the time of each sampling was determined by measuring the amount of residual terminal methylene groups by means of near-infrared spectrophotometry in carbon tetrachloride.

Verification of the accuracy of the near-infrared spectrophotometry data was obtained in two cases by hydrolyzing the rearrangement products in the presence of 2,4-dinitrophenylhydrazone by conventional procedure.

Detailed data on the examples is given in the following tables. Table I identifies the starting allylic ether, the catalyst, the amount of catalyst, reaction temperature and the rate of conversion to α,β-unsaturated ether with time. In each example the product was a clear, straw-to-yellow liquid which could be distilled to a clear, water-white liquid.

Table II shows a comparison of the degrees of conversion as determined on some of the products by means of near-infrared spectrophotometry and by 2,4-dinitrophenylhydrazone hydrolysis, respectively.

*Table I*

BASE-CATALYZED REARRANGEMENTS OF ALLYL ETHERS TO PROPENYL ETHERS

| Ex. No. | Compound Rearranged | Catalyst Compound | Conc., percent | Temp., °C. | Time, hrs. | Percent Converted | Time, hrs. | Percent Converted | Time, hrs. | Percent Converted | Time, hrs. | Percent Converted | Time, hrs. | Percent Converted | Time, hrs. | Percent Converted |
|---|---|---|---|---|---|---|---|---|---|---|---|---|---|---|---|---|
| 1 | Tetraallyl PE | CH$_3$ONa | 5 | 175 | 1.0 | 10.7 | 3.0 | 17.5 | 5.0 | 20.7 | 24.6 | 44.3 | 49.8 | 52.3 | 97.3 | 55.4 |
| 2 | Triallyl PE | CH$_3$ONa | 5 | 175 | 1.0 | 34.6 | 3.0 | 46.8 | 5.0 | 43.8 | 23.5 | | 52.2 | 57.0 | | |
| 3 | do | K tert-BuO | 15 | 175 | 6.0 | 84.3 | 48.0 | 86.1 | | | | | | | | |
| 4 | do | K tert-BuO | 5 | 175 | 1.0 | 14.1 | 3.0 | 21.5 | 6.0 | 21.5 | 24.0 | 23.2 | 48.0 | 23.2 | | |
| 5 | Trimethallyl PE | K tert-BuO | 5 | 175 | 1.0 | 62.3 | 3.0 | 67.4 | 6.0 | 75.7 | 24.0 | 85.8 | 48.0 | 88.3 | | |
| 6 | Diallyl PE Isopropylidene Ketal | K tert-BuO | 5 | 175 | 1.0 | 35.1 | 3.0 | 48.0 | 6.0 | 52.5 | 24.0 | 55.3 | 48.0 | 55.3 | | |
| 7 | 1,4-diallyl-oxybutane | K tert-BuO | 5 | 150 | 1.0 | 32.5 | 3.0 | 65.0 | 6.0 | 88.5 | 24.0 | 95.2 | 48.0 | >98.8 | | |
| 8 | 1,4-diallyl-oxybutane | K tert-BuO | 2 | 175 | 1.5 | 6.5 | 3.0 | 8.9 | 6.0 | 8.9 | 24.0 | 8.2 | 48.0 | 10.0 | | |
| 9 | 4-allyloxy-1-butanol | K tert-BuO | 5 | 175 | 1.5 | 8.0 | 3.0 | 13.7 | 6.0 | 20.1 | 24.0 | 39.7 | 48.0 | 44.4 | | |
| 10 | 1,5-diallyl-oxypentane | CH$_3$ONa | 5 | 175 | 2.3 | 1.5 | 6.0 | 2.8 | 22.3 | 2.8 | 46.6 | 3.5 | 70.5 | 7.5 | 142.5 | 18.5 |
| 11 | do | K tert-BuO | 5 | 150 | 1.0 | 94.2 | 6.0 | 89.6 | 48 | >98.7 | | | | | | |
| 12 | Ethyl allyl ether | K tert-BuO | 15 | 150 | 10.0 | >98.8 | | | | | | | | | | |
| 13 | n-Propyl allyl ether | K tert-BuO | 10 | 150 | 10.0 | >94.3 | | | | | | | | | | |

*Table II*

| Material Analyzed | Propenyl groups/product | |
|---|---|---|
| | 2,4-DNP Method | Near-Infrared Method |
| Rearranged 1,4-diallyloxybutane | 1.98 | >1.98 |
| Rearranged 1,5-diallyloxypentane | 1.88 | >1.97 |

As previously stated, the invention also relates to certain new and useful compounds that are obtainable by the process of the invention. More specifically, these new compounds are α,β-unsaturated ethers of a saturated tri- to hexahydric alcohol, said ethers containing at least one etherifying α,β-unsaturated group selected from the class consisting of propenyl and isobutenyl groups, and said ethers being free from hydroxyl groups in 1-3 position to each other.

Representative of the new compounds are tri- and tetrapropenyl pentaerythritol, tri- and tetraisobutenyl pentaerythritol, dipropenyl glycerol, dipropenyl trimethylolpropane, diisobutenyl trimethylolethane, hexapropenyl sorbitol, monopropenyl glycerol and the like.

These new compounds are useful in many different ways. In particular, they possess the same utilities possessed by the corresponding allyl or methallyl ethers of saturated polyhydric alcohols but are characterized by greater polymerizability by virtue of the greater activity of the propenyl and isobutenyl groups in comparison to allyl and methallyl groups.

More specifically, those of the new compounds that contain one or more hydroxyl groups are useful ingredients for the preparation of unsaturated polyesters where they contribute the properties of air-drying ability when the unsaturated polyester is copolymerized with an unsaturated monomer. For instance, tripropenyl pentaerythritol may be employed as a mono-functional reactant in the preparation of a polyester from a polyhydric alcohol and maleic or fumaric acid. Preferably, however, such polyesters will be formed by ester interchange rather than direct esterification because the propenyl and isobutenyl ethers have relatively poor stability to acids.

All of the new compounds whether they contain free hydroxyl groups or not are polymerizable to form solid polymers or copolymers. For instance, tetrapropenyl pentaerythritol is a useful polymerizable monomer for copolymerization with an unsaturated polyester resin. The same ether can also be polymerized by itself into a solid polymer through the agency of a catalyst prepared by reacting an aluminum alkoxide with sulfuric acid. In particular, those of the new compounds that contain more than one isopropenyl or isobutenyl group can be polymerized into thermoset polymers.

What I claim and desire to protect by Letters Patent is:

1. The process of making $\alpha,\beta$-unsaturated ethers which comprises contacting an allylic ether selected from the class consisting of allyl and methallyl ethers of pentaerythritol, pentaerythritol isopropylidene ketal, 1,4-dihydroxybutane, 1,5-dihydroxypentane, and cetyl alcohol, with a catalytic amount of a strongly basic compound of an alkali metal in a homogeneous reaction mixture at a temperature ranging from about 100° to 250° C., whereby the allylic groups of said allylic ether are rearranged to $\alpha,\beta$-unsaturated groups selected from the class consisting of propenyl and isobutenyl groups.

2. The process of claim 1 in which the allylic ether is an allyl ether of pentaerythritol.

3. The process of claim 1 wherein said allylic ether is an allyl ether of 1,4-dihydroxybutane.

4. The process of claim 1 wherein the strongly basic compound of an alkali metal is an alkali metal alkoxide.

5. The process of claim 1 wherein the allylic ether is the triallyl ether of pentaerythritol.

6. The process of claim 1 wherein the allylic ether is the tetraallyl ether of pentaerythritol.

7. The process of claim 1 wherein the allylic ether is the trimethallyl ether of pentaerythritol.

References Cited by the Examiner

UNITED STATES PATENTS 2,996,550   8/61   Simons _____ 260—615

OTHER REFERENCES

Berlow et al.: The Pentaerythritols (1958), p. 124.

Dege et al.: Jour. Amer. Chem. Soc., vol. 81, July 17, 1959, pages 3374–3379, QD1A5.

Migrdichian: Organic Synthesis, vol. II, (1957), p. 900.

LEON ZITVER, *Primary Examiner.*

CHARLES B. PARKER, *Examiner.*